(12) United States Patent
Gauzner et al.

(10) Patent No.: US 8,312,609 B2
(45) Date of Patent: Nov. 20, 2012

(54) METHOD OF MANUFACTURING A PATTERNED MEDIA STAMPER

(75) Inventors: Gennady Gauzner, Livermore, CA (US); Nobuo Kurataka, Campbell, CA (US); Dieter Klaus Weller, San Jose, CA (US); Christopher Joseph Formato, Brentwood, CA (US)

(73) Assignee: Seagate Technology, LLC, Cupertino, CA (US)

( * ) Notice: Subject to any disclaimer, the term of this patent is extended or adjusted under 35 U.S.C. 154(b) by 984 days.

(21) Appl. No.: 12/178,416

(22) Filed: Jul. 23, 2008

(65) Prior Publication Data

US 2010/0018028 A1 Jan. 28, 2010

(51) Int. Cl.
*B23P 17/00* (2006.01)
*C23C 16/00* (2006.01)

(52) U.S. Cl. .......... 29/424; 29/426.1; 29/458; 29/527.2; 29/603.01; 264/138; 427/255.14; 427/255.17; 427/255.6

(58) Field of Classification Search ............... 29/424, 29/458, 527.2, 603.01, 604, 426.1, 426.4, 29/426.5; 428/827, 830, 831; 264/138; 427/255.14, 427/255.17, 255.6
See application file for complete search history.

(56) References Cited

U.S. PATENT DOCUMENTS

| | | | |
|---|---|---|---|
| 5,991,104 A | 11/1999 | Bonyhard | |
| 6,086,961 A | 7/2000 | Bonyhard | |
| 6,088,178 A | 7/2000 | Ishida et al. | |
| 6,153,281 A | 11/2000 | Meyer et al. | |
| 6,181,492 B1 | 1/2001 | Bonyhard | |
| 7,105,280 B1* | 9/2006 | Deeman et al. | 430/320 |
| 7,150,844 B2* | 12/2006 | Deeman et al. | 264/220 |
| 7,294,294 B1* | 11/2007 | Wago et al. | 264/2.5 |
| 7,695,667 B2* | 4/2010 | Best et al. | 264/335 |
| 7,901,607 B2* | 3/2011 | Xu et al. | 264/297.4 |
| 2004/0202865 A1 | 10/2004 | Homola et al. | |
| 2004/0217085 A1 | 11/2004 | Jeans | |
| 2005/0047798 A1 | 3/2005 | Wan | |
| 2005/0048798 A1 | 3/2005 | Bojkov et al. | |
| 2005/0082700 A1* | 4/2005 | Deeman et al. | 264/2.5 |
| 2006/0134560 A1 | 6/2006 | Lee et al. | |
| 2007/0211592 A1* | 9/2007 | Sakurai et al. | 369/47.49 |
| 2007/0257396 A1* | 11/2007 | Wang et al. | 264/219 |
| 2008/0131548 A1* | 6/2008 | Gauzner et al. | 425/175 |
| 2008/0285428 A1* | 11/2008 | Sewell | 369/272.1 |

FOREIGN PATENT DOCUMENTS

JP 2004-234710 8/2004

OTHER PUBLICATIONS

Bilenberg et al.; Topas-based lab-on-a-chip Microsystems fabricated thermal nanoimprint lithography; J. Vac. Sci. Technol. B 23 (6), Nov./Dec. 2005, p. 2944.
H. Sun, et al./Applied Surface Science 254 (2008) pp. 2955-2959; Anti-sticking treatment for a nanoimprint stamp.
S. Park et al./Microelectronic Engineering 73-74 (2004) 196-201; Anti-adhesive layers on nickel stamps for nanoimprint lithography.
Office Actions dated: Aug. 5, 2011 & Nov. 21, 2011 for U.S. Appl. No. 12/202,554.

* cited by examiner

*Primary Examiner* — Jermie Cozart
(74) *Attorney, Agent, or Firm* — Ladas & Parry, LLP

(57) ABSTRACT

The invention relates to a method of manufacturing a patterned media Ni stamper comprising depositing a perfluorodecyltrichlorosilane release layer. The release layer eliminates bonding at the master-stamper interface. A permanent master for manufacturing a patterned media stamper is also provided.

15 Claims, 3 Drawing Sheets

METHOD OF MANUFACTURING A PATTERNED MEDIA STAMPER

BACKGROUND

Magnetic recording media are widely used in various applications, e.g., in hard disk form, particularly in the computer industry, for storage and retrieval of large amounts of data/information. These recording media are conventionally fabricated in thin film form and are generally classified as "longitudinal" or "perpendicular", depending upon the orientation (i.e., parallel or perpendicular) of the magnetic domains of the grains of the magnetic material constituting the active magnetic recording layer, relative to the surface of the layer. FIG. 1 shows a disk recording medium and a cross section of a disk demonstrating the difference between longitudinal and perpendicular recording.

In the operation of magnetic media, the magnetic layer is locally magnetized by a write transducer or write head to record and store data/information. The write transducer creates a highly concentrated magnetic field which alternates direction based on the bits of information being stored. When the local magnetic field applied by the write transducer is greater than the coercivity of the recording medium layer, then the grains of the polycrystalline magnetic layer at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. By moving the actuator arm, the magnetic head assembly is moved radially on the disk surface between tracks. Typically, recording media require pattern formation in the surface of the disk to facilitate operation. For example, servo patterns of magnetically readable information are embedded in the disk to inform the magnetic head assembly of track location. The patterns include both radial indexing information and centering patterns to precisely position the head over the center of the track.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time-consuming process.

A stamper/imprinter comprised of a magnetic material having a high saturation magnetization, $B_{sat}$, i.e., $B_{sat}$=about 0.5 Tesla, and a high permeability, $\mu$, i.e., $\mu$=about 5, e.g., selected from Ni, NiFe, CoNiFe, CoSiFe, CoFe, and CoFeV, can be effectively utilized as a contact "stamper/imprinter" for contact "imprinting" of a magnetic transition pattern, e.g., a servo pattern, in the surface of a magnetic recording layer of a magnetic medium ("workpiece"), whether of longitudinal or perpendicular type. FIG. 2 illustrates contact imprinting in the case of perpendicular media.

An advantage of this process is the ability to fabricate the topographically patterned imprinting surface of the stamper/imprinter, as well as the substrate or body therefor, of a single material, as by use of well-known and economical electro-forming techniques.

Stampers/imprinters for use in a typical application, e.g., servo pattern formation in the recording layer of a disk-shaped, thin film, longitudinal or perpendicular magnetic recording medium comprise an imprinting surface having topographical features consisting of larger area data zones separated by smaller areas with well-defined patterns of projections and depressions corresponding to conventionally configured servo sectors.

Stampers/imprinters suitable for use in performing the foregoing patterning processes are typically manufactured by a sequence of steps which include providing a "master" comprised of a substantially rigid substrate, e.g., Si, with a patterned layer of a resist material thereon, the pattern comprising a plurality of projections and depressions corresponding (in positive or negative image form, as necessary) to the desired pattern to be formed in the surface of the stamper/imprinter. Stampers/imprinters are made from the master by initially forming a thin, conformal layer of an electrically conductive, magnetic material (e.g., Ni) over the patterned resist layer and then electro-forming a substantially thicker ("blanket") magnetic layer (of the aforementioned magnetic metals and/or alloys) on the thin layer of electrically conductive material, which electro-formed blanket layer replicates the surface topography of the resist layer. Upon completion of the electro-forming process, the stamper/imprinter, termed a "father" is separated from the master, and is then in turn used for making a "family" of stampers/imprinters, including one or more "mother" and "son" stampers/imprinters.

The critical process step in manufacturing the stamper/imprinter is separation from the master. The bond between a Ni stamper and a Si master is so strong that the Si wafer may be torn apart during separation and fragments of Si may adhere to the surface of the Ni father stamper. This result in a stamper that is not well-formed and a master that cannot be used to make additional stampers because its features are damaged or distorted.

SUMMARY

One embodiment of the invention is a method of manufacturing a patterned media stamper comprising depositing a perfluorodecyltrichlorosilane release layer on a Si substrate, forming a Ni stamper on the release layer, and separating the Ni stamper from the Si substrate. The perfluorodecyltrichlorosilane release layer may be deposited, for example, by molecular vapor deposition. In one variation, a thickness of the perfluorodecyltrichlorosilane release layer is from about 10 Å to about 30 Å. The thickness in another variation is about 15 Å.

In another variation, the step of depositing a perfluorodecyltrichlorosilane release layer on a Si substrate comprises depositing a perfluorodecyltrichlorosilane layer by molecular vapor deposition. In another, the method further comprises baking the perfluorodecyltrichlorosilane layer.

In yet another variation, the step of forming a Ni stamper on the release layer comprises depositing a Ni or Ni-based alloy layer on the release layer and depositing Ni on the Ni or Ni-based alloy layer. The Ni or Ni-based alloy layer may, for example, comprise NiV and have a thickness of about 110 nm.

In another variation, the step of depositing Ni on the Ni or Ni-based alloy layer comprises electroplating with Ni. The thickness of the electroplated Ni may be, for example, 200 µm.

Another embodiment of the invention is a permanent master for the manufacture of a patterned media stamper having a patterned Si substrate and a perfluorodecyltrichlorosilane (FDTS) release layer. In one variation, the thickness of the release layer ranges from about 10 Å to about 30 Å. In another variation, the thickness is about 15 Å.

When a Ni stamper electroformed on the permanent master is separated from the permanent master, the patterned Si substrate is not damaged and the Ni stamper is substantially free of fragments of the Si substrate.

Additional advantages of this invention will become readily apparent to those skilled in this art from the following detailed description, wherein only the preferred embodiments of the invention are shown and described, by way of illustration of the best mode contemplated for carrying out the invention. As will be realized, this invention is capable of other and different embodiments, and its details are capable of modifications in various obvious respects, all without departing from the invention. Accordingly, the drawings and description are to be regarded as illustrative in nature and not as restrictive.

BRIEF DESCRIPTION OF THE DRAWINGS

The present invention will be better understood by reference to the Detailed Description when taken together with the attached drawings, wherein.

DETAILED DESCRIPTION

Figure 1:
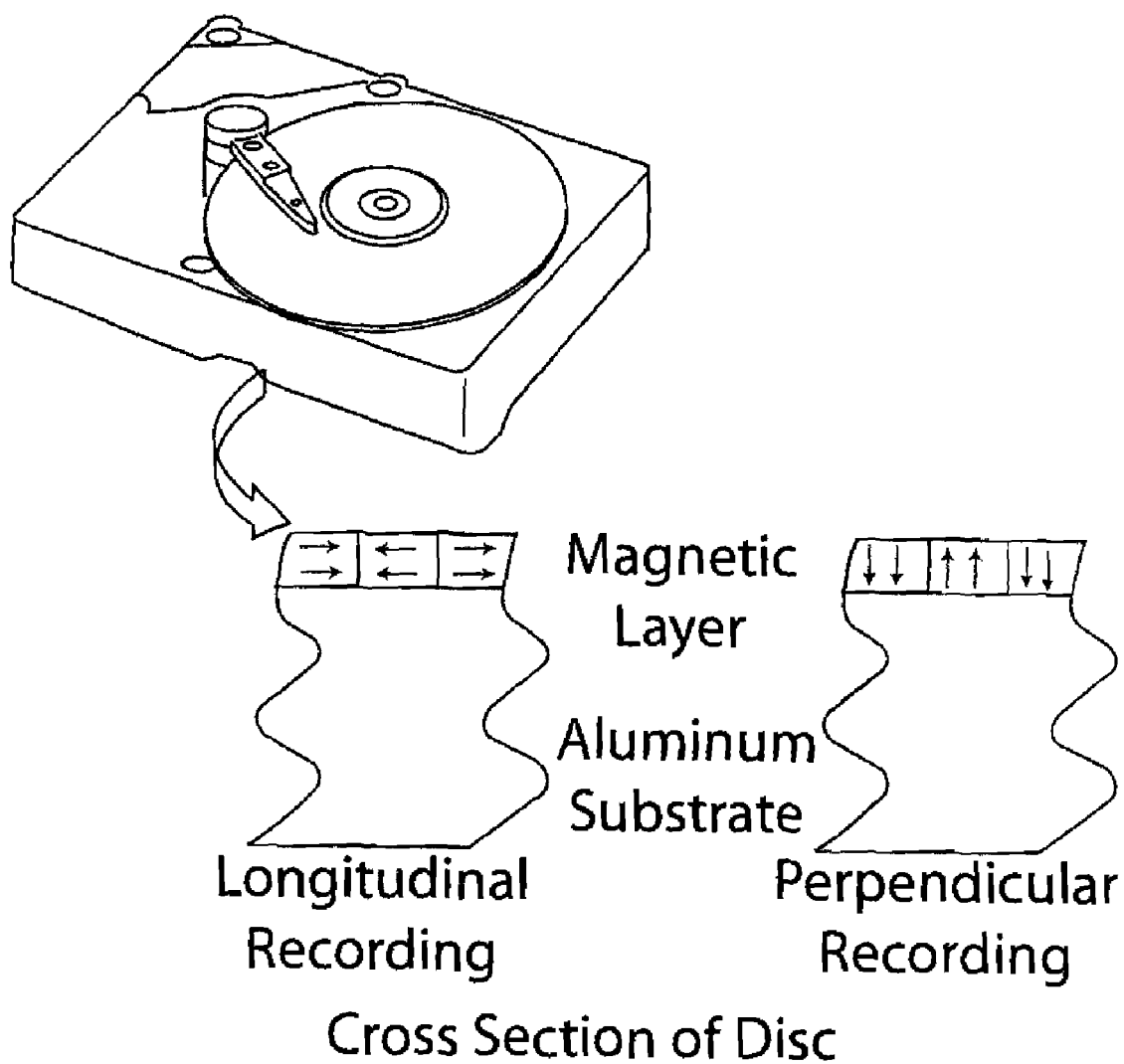
FIG. 1 schematically shows a magnetic disk recording medium comparing longitudinal and perpendicular magnetic recording.
Figure 2:
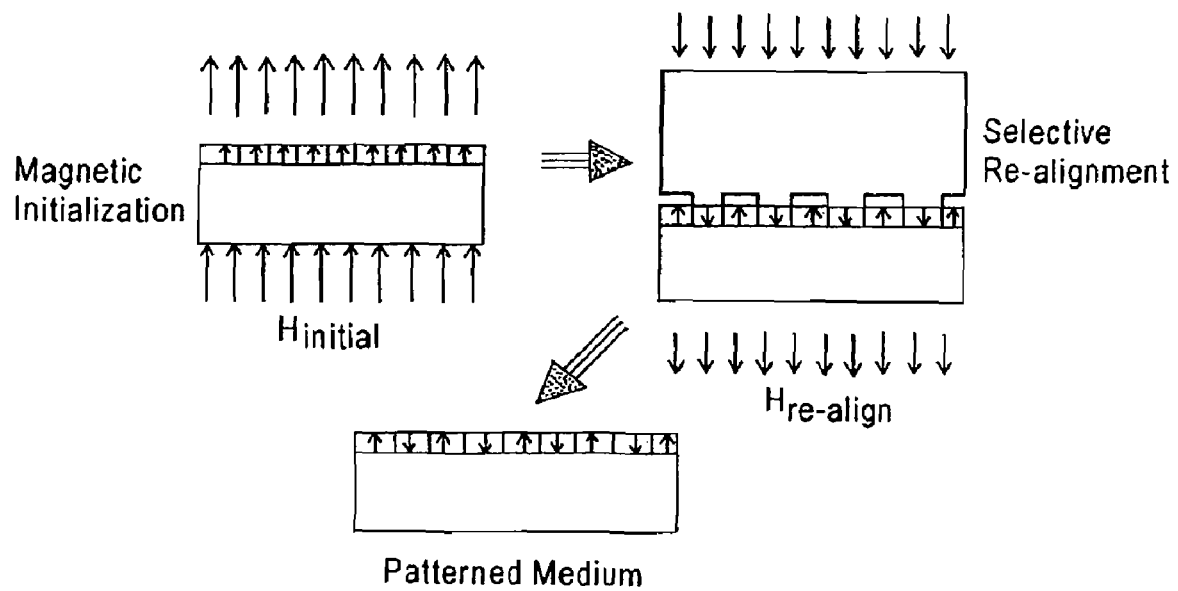
FIG. 2 shows schematically contact printing of a magnetic transition pattern in the surface of a perpendicular magnetic recording layer.
Figure 3:
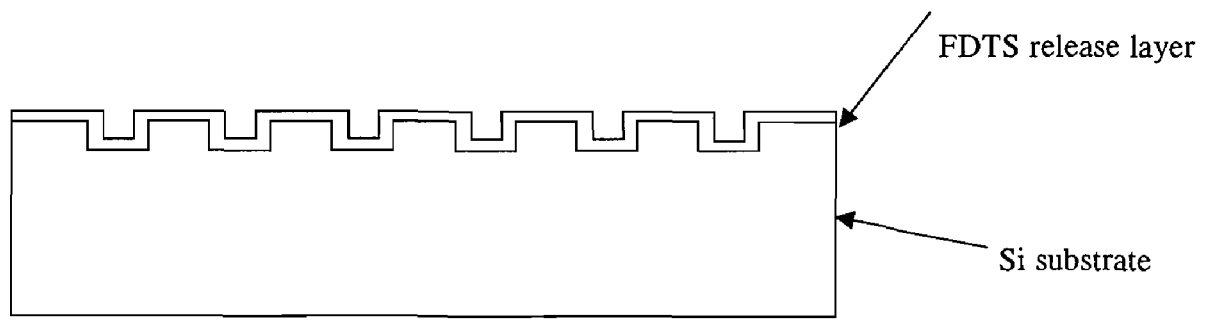
FIG. 3 illustrates a permanent master comprising a patterned Si substrate and a perfluorodecyltrichlorosilane (FDTS) release layer.

The invention relates to a method of manufacturing a patterned media Ni stamper comprising depositing a perfluorodecyltrichlorosilane (FDTS) release layer. The release layer comprises perfluoro-decyl-trichloro-silane (FDTS), which can be applied, for example, by Molecular Vapor Deposition (MVD).

After plating, the stamper is easily removed from the master. The features on the stamper are well-formed and replicate the surface topology of the master. The features on the master are not damaged or distorted. Therefore, a single master can be used to make multiple stampers.

EXAMPLES

The invention will be better understood with reference to the following examples, which are intended to illustrate specific embodiments within the overall scope of the invention as claimed.

Example 1

A Si wafer was coated with approximately 150 nm of TOK resist and exposed using an Elionix E-beam Writer and developed. The wafer was etched in an Oxford RIE-100 etcher using SF6 chemistry and subsequently ashed by $O_2$ plasma in the etcher. Etch depth was 70 nm.

The etched wafer was coated with a FDTS release layer of the present invention having a thickness of about 15 Å by molecular vapor deposition in an Applied Micro Structures MVD-100 tool. The wafer with the release layer was baked at 110° C. for 30 min on a hot plate.

The wafer was then sputtered with 110 nm of NiV in a 4M Metallizer and electroplated with approximately 200 µm of Ni in a Toolex electroplating bath.

After plating, the electroformed Ni "stamper" easily separated from the Si wafer. There were no "horns" on the stamper, and the stamper features were identical to those of the wafer. The features on the Si wafer were not damaged or distorted, so that it could be used to make additional stampers.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A method of manufacturing a patterned media stamper comprising:
   depositing a perfluorodecyltrichlorosilane release layer on a substrate;
   forming a Ni stamper on the release layer; and
   separating the Ni stamper from the substrate.

2. The method of claim 1, wherein the step of depositing a perfluorodecyltrichlorosilane release layer on a substrate comprises depositing a perfluorodecyltrichlorosilane layer by molecular vapor deposition.

3. The method of claim 2, further comprising baking the perfluorodecyltrichlorosilane layer.

4. The method of claim 1, wherein the step of forming a Ni stamper on the release layer comprises depositing a Ni or Ni-based alloy layer on the release layer and depositing Ni on the Ni or Ni-based alloy layer.

5. The method of claim 4, wherein a thickness of the Ni or Ni-based alloy layer is about 110 nm.

6. The method of claim 4, wherein the step of depositing Ni or the Ni or Ni-based alloy layer comprises electroplating with Ni.

7. The method of claim 6, wherein a thickness of the perfluorodecyltrichlorosilane release layer is from about 10 Å to about 30 Å.

8. The method of claim 7, wherein the thickness of the perfluorodecyltrichlorosilane release layer is about 15 Å.

9. The method of claim 4, wherein a thickness of the perfluorodecyltrichlorosilane release layer is from about 10 Å to about 30 Å.

10. The method of claim 9, wherein the thickness of the perfluorodecyltrichlorosilane release layer is about 15 Å.

11. The method of claim 1, wherein the Ni or N-based alloy layer comprises NiV.

12. The medium of claim 11, wherein a thickness of the Ni or Ni-based alloy layer is about 110 nm.

13. The method of claim 12, wherein a thickness of the electroplated Ni is about 200 μm.

14. The method of claim 1, wherein a thickness of the perfluorodecyltrichlorosilane release layer is from about 10 Å to about 30 Å.

15. The method of claim 14, wherein the thickness of the perfluorodecyltrichlorosilane release layer is about 15 Å.

* * * * *